(12) United States Patent
Wallace et al.

(10) Patent No.: US 8,589,019 B2
(45) Date of Patent: Nov. 19, 2013

(54) SYSTEMS AND METHODS FOR VEHICLE MONITORING WITH PROCESSING INTERRUPTION TOLERANCE

(75) Inventors: Charles L. Wallace, San Diego, CA (US); Ernest Basin, San Diego, CA (US); Eric G. DeWall, San Diego, CA (US); Sjef van Gool, North Brabant (NE); Rajendra K. Somla, San Diego, CA (US); Daniel A. Deninger, San Diego, CA (US); Douglas C. Woody, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 13/107,304

(22) Filed: May 13, 2011

(65) Prior Publication Data

US 2012/0290166 A1    Nov. 15, 2012

(51) Int. Cl.
*G06F 7/00*   (2006.01)
(52) U.S. Cl.
CPC ........................................ *G06F 7/00* (2013.01)
USPC ......... 701/29.2; 701/30.1; 701/30.4; 707/687
(58) Field of Classification Search
USPC ........... 701/29.2–34.4; 700/30; 707/674–686, 707/699
See application file for complete search history.

(56) References Cited

U.S. PATENT DOCUMENTS

| | | | |
|---|---|---|---|
| 5,745,864 A | | 4/1998 | Hosoe et al. |
| 6,230,082 B1 * | | 5/2001 | Harada et al. ..................... 701/1 |
| 7,693,649 B2 * | | 4/2010 | Groer et al. ................... 701/115 |
| 7,999,667 B2 * | | 8/2011 | Carralero et al. ............. 340/531 |
| 8,000,855 B2 * | | 8/2011 | Bauerle et al. ................ 701/33.6 |
| 8,280,579 B2 * | | 10/2012 | Yasue et al. ................... 701/33.4 |
| 8,412,496 B2 * | | 4/2013 | Canedo et al. ..................... 703/2 |
| 2004/0093137 A1 * | | 5/2004 | Okada ............................. 701/36 |
| 2005/0027749 A1 * | | 2/2005 | Ohno et al. ................... 707/200 |

(Continued)

FOREIGN PATENT DOCUMENTS

| | | |
|---|---|---|
| EP | 2034409 A1 | 3/2009 |
| JP | 2009123173 A | 6/2009 |
| WO | WO02059749 A1 | 8/2002 |
| WO | WO2005113307 A1 | 12/2005 |

OTHER PUBLICATIONS

International Search Report and Written Opinion—PCT/US2012/037818, International Search Authority—European Patent Office, Aug. 8, 2012.

*Primary Examiner* — Thomas Tarcza
*Assistant Examiner* — Tyler J Lee
(74) *Attorney, Agent, or Firm* — Ashish L. Patel; Gerald P. Joyce, III

(57) ABSTRACT

Embodiments relate to systems and methods for vehicle monitoring with processing interruption tolerance. One or more vehicle sensors can transmit one or more data streams to a primary data processing system via a data channel. A secondary data buffer can be coupled to the data channel to continuously capture the set of data streams and/or subsets thereof. During normal operation, the set of data streams are processed by the primary data processing system. After a limited-duration fault occurs in the primary data processing system, it can recover by accessing the backup data in the secondary data buffer. The lost data can be retrieved from the secondary data buffer using timestamp information to process the data in its original time context and to ensure that no already-processed data is included. The set of data streams can be downsampled or decimated in the secondary data buffer to extend storage capacity.

80 Claims, 7 Drawing Sheets

(56) References Cited

U.S. PATENT DOCUMENTS

| | | | |
|---|---|---|---|
| 2005/0097288 A1* | 5/2005 | Holzmann | 711/162 |
| 2008/0306645 A1* | 12/2008 | Dewhurst et al. | 701/29 |
| 2009/0112381 A1 | 4/2009 | Schwinn et al. | |
| 2009/0222163 A1* | 9/2009 | Plante | 701/35 |
| 2009/0254240 A1* | 10/2009 | Olsen et al. | 701/30 |
| 2010/0090821 A1* | 4/2010 | Gallon | 340/479 |
| 2012/0035800 A1* | 2/2012 | Roberts | 701/29.1 |

* cited by examiner

SYSTEMS AND METHODS FOR VEHICLE MONITORING WITH PROCESSING INTERRUPTION TOLERANCE

FIELD

The present teachings relate to systems and methods for vehicle monitoring with processing interruption tolerance, and more particularly, to platforms and techniques for capturing one or more data streams from one or more vehicle sensors or other data generating devices or sources in an onboard secondary data processing system configured to track and store the one or more data streams to a buffer with an absolute time reference that can be used for data recovery, during and/or after a processing interruption in the vehicle's primary data processing system takes place.

BACKGROUND

In transportation, logistics, fleet management, and related applications, the state of vehicle sensors or other data generating devices or sources may be tracked over periods of vehicle operation for purposes of route or schedule planning, vehicle maintenance, regulatory compliance, or for other reasons. A truck or other vehicle can be equipped with a variety of sensors, switches, and/or other telemetry devices, such as, merely for example, speed sensors, position sensors (including Global Positioning System, or GPS-based sensors), and other types of sensors or data registers or sources. The vehicle can likewise be equipped with government-mandated monitoring devices, such as a tachograph or related devices required in European jurisdictions.

As part of or in addition to continuously sampled or otherwise free-running streamed data, in many applications the data captured in a primary data processing system can include state or status registration data, such as data reflecting the state of vehicle components or subsystems, for example the state of the vehicle's ignition system, braking system, acceleration system, or others. The vehicle can further be equipped with additional safety devices or others which produce or report data on a discrete, event-triggered, or other basis that is not continuously or periodically sampled or reported, but which data can also be incorporated in the set of data streams. In general, the set of vehicle sensors or other data sources can transmit or deliver the captured data, including but not limited to continuously sampled data streams, to a main onboard computer or other electronic control device. That device can generally be referred to as a primary data processing system (or a vehicle data processing system).

In operation, the intake and processing of the set of data streams from the set of vehicle sensors in the primary data processing system can from time to time become unexpectedly interrupted. This can take place due to a software or hardware fault or crash in the primary data processing system, or due to other causes or factors. During the interruption of the processing of the set of sensor data streams or other data inputs in the primary data processing system, no information about the state of the various sensors may be recorded or processed, and significant information about the vehicle and its operating state can be lost. In some jurisdictions, having losses or gaps in the set of data streams from a vehicle's sensors or other data reporting devices may not be satisfactory or sufficient under local regulatory requirements. The provisioning of a secondary data capture device may therefore be desirable or necessary.

However, secondary data capture platforms that may exist or be available in the transportation industry, such as continuously running secondary electronic memories or others, may not by themselves be adequate to fully or sufficiently reconstruct gaps in the set of data streams and other data.

It may be desirable to provide systems and methods for vehicle monitoring with processing interruption tolerance, in which a secondary data capture device, platform, or buffer can be configured to capture the raw set of sensor data streams, a subset of the sensor data streams, and/or other data values, possibly on a downsampled, compressed, decimated, or other altered basis, with associated timestamp or other temporal records, fields, or attributes that can be used to accurately re-insert, recover, or reconstruct data which is lost during an interruption in the processing of the set of data streams in the primary data processing system, while avoiding the insertion of data that was already processed before the interruption. Systems and methods for vehicle monitoring with processing interruption tolerance that are capable of inserting changes in selected system states that occurred during the interruption along with their associated timestamps, without necessarily subjecting that state data to downsampling or loss of detail, would likewise be desirable.

SUMMARY

In one aspect, a method of processing vehicle data includes receiving one or more data streams generated by a set of vehicle sensors in a primary data processing system, wherein data in the one or more data streams is associated with respective timestamps. The method further includes storing at least a selected subset of the one or more data streams and the timestamps in a secondary data processing system and responding to a fault condition in the processing of the one or more data streams in the primary data processing system. Moreover, the method includes recovering lost data in the one or more data streams caused by the fault condition based on the at least a selected subset of the one or more data streams and the timestamps stored in the secondary data processing system.

In another aspect, a system for processing vehicle data includes an interface to a set of vehicle sensors generating one or more data streams, the one or more data streams having an associated timestamps. The system further includes a secondary data processing system, communicating with the set of vehicle sensors via the interface, and being configured to store at least a selected subset of the one or more data streams and the timestamps. Moreover, the system includes a primary data processing system, communicating with the set of vehicle sensors and with the secondary data processing system, and configured to receive the one or more data streams, respond to a fault condition in the processing of the one or more data streams in the primary data processing system, and recover lost data in the one or more data streams caused by the fault condition based on the at least a selected subset of the one or more data streams and the timestamps stored in the secondary data processing system.

Further aspects provide a system for processing vehicle data including first means for providing an interface to a set of vehicle sensor means generating one or more data streams having an associated timestamps. The system additionally includes second means for providing a secondary data processing system, communicating with the set of vehicle sensor means via the interface, and being configured to store at least a selected subset of the one or more data streams and the timestamps. Moreover, the system includes third means for providing a primary data processing system, communicating with the set of vehicle sensor means and with the second means for providing the secondary data processing system, and configured to receive the one or more data streams, respond to a fault condition in the processing of the one or more data streams in the primary data processing system, and recover lost data in the one or more data streams caused by the fault condition based on the at least a selected subset of the one or more data streams and the timestamps stored in the secondary data processing system.

In an additional aspect, a computer program product comprising computer-readable medium includes at least one instruction for causing a computer to receive one or more data streams generated by a set of vehicle sensors in a primary data processing system, the one or more data streams having an associated timestamps. Moreover, the computer program product includes at least one instruction for causing a computer to store at least a selected subset of the one or more data streams and the timestamps in a secondary data processing system and at least one instruction for causing a computer to respond to a fault condition in the processing of the one or more data streams in the primary data processing system. The computer program product further includes at least one instruction for causing a computer to recover lost data in the one or more data streams caused by the fault condition based on the at least a selected subset of the one or more data streams and the timestamps stored in the secondary data processing system.

DESCRIPTION OF DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Embodiments of the present teachings relate to systems and methods for vehicle monitoring with processing interruption tolerance. More particularly, implementations relate to vehicle monitoring platforms and techniques in which a secondary data processing system tracks and stores one or more data streams and other data from onboard vehicle sensors and/or other data recording devices, in parallel to or in conjunction with the receipt of the same data streams by a primary data processing system. The set of data streams and/or other data can be encoded, recorded, or associated with a series of timestamps indicating a time reference for the time at which those data values were captured and/or received, creating an absolute (not relative) reference point for each piece of captured sensor data. For example, as data is received by the vehicle monitoring system with processing interruption tolerance a timestamp is associated with the data. Upon a fault state or error condition that causes an interruption, suspension, or failure of processing of the data streams and/or other data in the primary data processing system, onboard logic can determine the set of intervening timestamps and/or other data of the data stream during which the secondary data buffer has recorded valid values for those data points, while the primary data processing system has not. In some aspects, the one or more data streams may include infrequently transmitted data such as data indicating a change of state. Additionally or alternatively, the other data may include infrequently transmitted data such as data indicating a change of state.

After a restart procedure has been initiated, the onboard logic can consequently extract the intervening or backup data values or samples from the secondary data buffer, and reconstruct or insert those values into the primary data processing system during the correct time window during which the primary data processing system was unable to process that data. These and other embodiments described herein address the various noted shortcomings in known vehicle monitoring technology, and provide an operator with enhanced robustness and recovery capability in their vehicle monitoring operations.

Reference will now be made in detail to exemplary embodiments of the present teachings, which are illustrated in the accompanying drawings. Where possible the same reference numbers will be used throughout the drawings to refer to the same or like parts.

Figure 1:
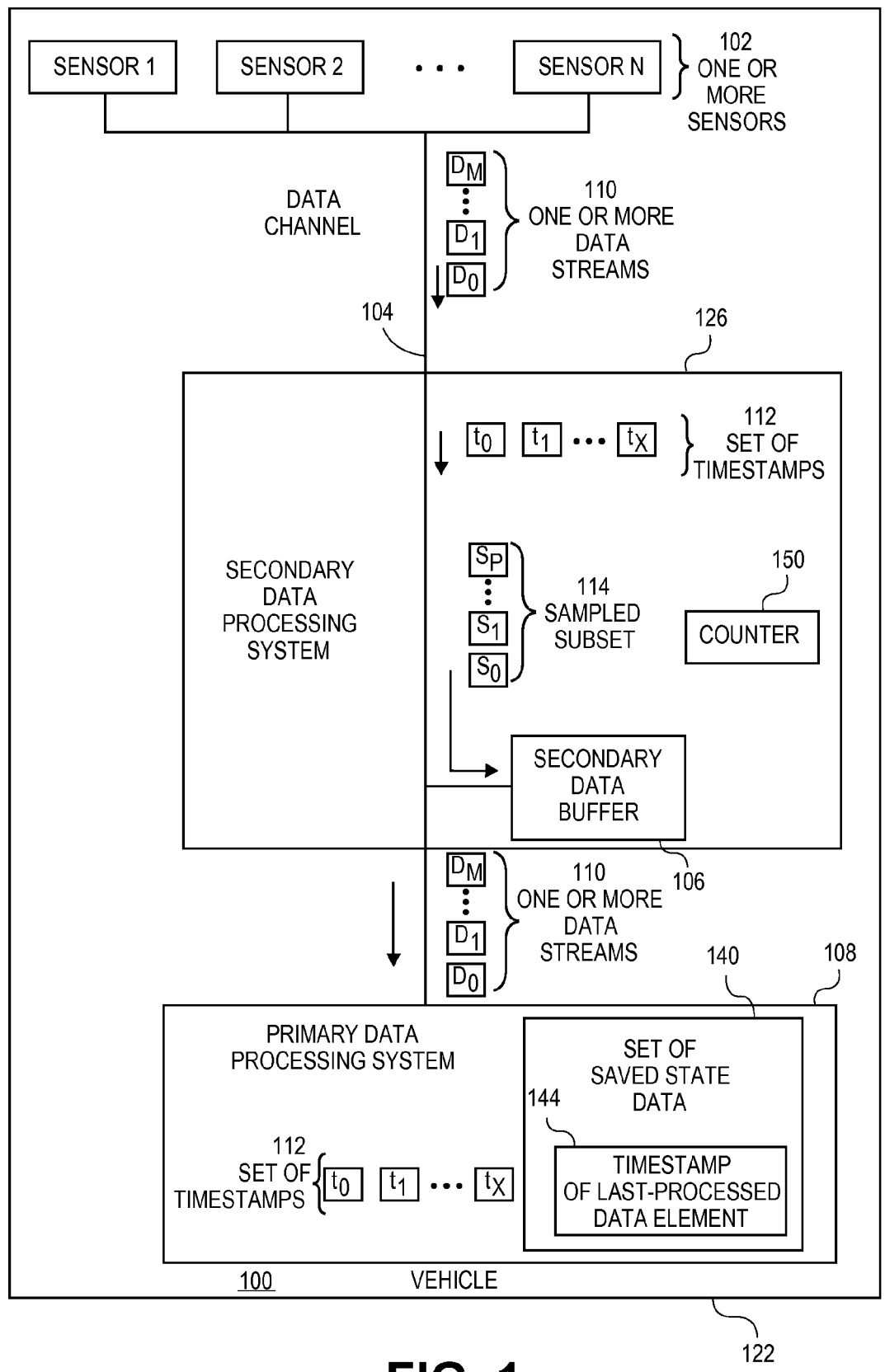
FIG. 1 illustrates an overall system for vehicle monitoring with processing interruption tolerance, according to various aspects.

FIG. 1 illustrates an overall network 100 in which systems and methods for vehicle monitoring with processing interruption tolerance can operate, according to various implementations. In aspects as shown, a vehicle 122 (schematically shown) can comprise, host or include a set of data processing resources including one or more sensors 102, a data channel 104, and a primary data processing system 108. In aspects, the vehicle 122 can be or include any type or variety of vehicle or transportation equipment or stock, such as, for example, an automobile, a truck or lorry including commercially configured trucks or lorries, a train or other tracked or untracked vehicle, an aircraft, a ship or other waterborne vessel, and/or other types or varieties of vehicles. In aspects, the primary data processing system 108 fitted to, equipped, and/or included in the vehicle 122 can be any type of computer and/or other onboard control logic, including various data processing resources such as a microprocessor or microcontroller, random access memory (RAM) or other memory, input/output buses and connections, storage such as hard disk or solid state storage, and/or other resources. In aspects, the primary data processing system 108 can be or include a single board computer and/or other control device, and/or can include other hardware, software, and/or other resources.

In implementations, the one or more sensors 102 can be or include any type of monitoring, recording, or sensing device or instrument, such as, merely for example, a speed sensor, an ignition status sensor, a tachometer sensor, an acceleration sensor, a brake status sensor, a vehicle position sensor, a temperature sensor, or a wheel position sensor. As used herein, the term "sensor" can encompass other sensors, telemetric devices, measuring devices, monitoring devices, navigation devices, and/or other instruments, circuits, or devices, whether those devices operate on a continuously sampled, non-continuously sampled, free-running, event-triggered, and/or other basis.

According to aspects, the one or more sensors 102 can read, sense, register, and/or generate one or more data streams 110 that the sensors transmit or communicate to the primary data processing system 108 via the data channel 104. In aspects, the set of data streams can comprise a set of digital values, such as 8, 16, 24, 32, 48, and/or 64-bit words, datagrams, and/or values, and can be sampled or transmitted to the primary data processing system 108 via data channel 104 at various sampling or clock rates, such as, merely for example, 1 MHz, 5 MHz, 10 MHz, or 20 MHz. However, other rates and/or frequencies may be employed. In aspects, the data channel 104 can be or include an electronic bus, which can for example comprise a set of multiplexed channels, subchannels, or connections. The data channel 104 can, in addition or instead, comprise multiple separate electronic connections, such as wiring harnesses, backplanes, and/or other connections. In implementations, the data channel 104 can also or instead comprise radio frequency or other wireless connections, and/or optical connections or channels. Other types and transmission media can be used.

In aspects as shown, the vehicle 122 can also host or include a secondary data processing system 126 that is connected to the data channel 104 and which is configured to capture sensor data and/or other, and recover and supply that data to the primary data processing system 108 after interruptions or faults in that system, as described herein. In aspects, the secondary data processing system 126 can be or include a vehicle input/output processing system, and/or other hardware, software, and/or related resources.

In aspects, and as shown in FIG. 1, during normal operation during which no interruption, fault or exception is occurring in the primary data processing system 108, the primary data processing system 108 can receive the one or more data streams 110 directly via the channel 104, and capture, process, and/or record that information for maintenance, vehicle management, regulatory, and/or other purposes. At the same time, during the same type of normal operation, the secondary data processing system 126 can likewise receive and store the one or more data streams 110 and/or a sampled subset 114 of those streams in an onboard and/or associated secondary data buffer 106. In aspects, the secondary data buffer 106 can be or include electronic memory such as RAM, but can in addition or instead include magnetic media such as hard disks, optical media such as recordable optical disks, and/or other memory or storage. In implementations, in regards, the secondary data buffer 106 can be configured to be of smaller size or capacity than the primary data processing system 108, for example due to the temporary or backup nature of the data storage in the secondary data buffer 106. In aspects, the secondary data buffer 106 can instead be configured to have equal or greater capacity than the primary data processing system 108, depending on implementation. In aspects, the secondary data buffer 106, primary data processing system 108, secondary data processing system 126, and/or other devices can each be configured with error-detecting and/or error-correcting memory, shielded circuits to protect against radio frequency interference, and/or other media or data protection features.

According to aspects, the one or more data streams 110 can have an associated set of timestamps 112 reflecting an absolute or non-relative time value for each data point or value, or set of data points or values, reflected in the one or more data streams 110 for each sample taken or received. In aspects and as shown, the time value or time reference identified in the set of timestamps 112 can be generated, for example, by a counter 150 and/or other time reference or time source, which can be integrated in the secondary data processing system 126. In aspects, the time reference used by or encoded in the set of timestamps 112 can in addition or instead be generated by or referenced to other counters, clocks, registers, time references, and/or time sources. Those references or sources can be single or multiple, and/or can be located internally or externally to the secondary data processing system 126. For example, the value of each timestamp in the set of timestamps 112 can be recorded with respect to an external, absolute, and/or other reference, such as, for example, an embedded, integrated, or master clock in the data channel 104, the counter 150 which as noted can be embedded or integrated in the secondary data processing system 126, an embedded, integrated, or master clock in the secondary data buffer 106, an embedded, integrated, or master clock for the vehicle 122, and/or other clock sources, signals, or references. For example, in implementations, time signals contained in cellular telephone transmissions or global positioning system (GPS) transmissions can also or instead be used.

In aspects, the set of timestamps 112 can be included as stored values within, or associated with, the one or more data streams 110. The set of timestamps 112 can for example be recorded as a concatenated attribute or value attached to the one or more data streams 110, and/or can be included within the set of data values encoded within the one or more data streams 110. In aspects, each value in the set of timestamps 112 can be stored or encoded in a time-value format, such as, merely for example, "Month_M:Day_X:Hour_Y:Minute_Z:Second_A_Millisecond_B," and/or other formats, data structures, or time value encodings. In implementations, the set of timestamps 112 can be encoded in other or different formats, such as a simplified total clock "tick" count generated by counter 150 (which can conserve memory), and/or others. It may be noted that according to aspects, the primary data processing system 108, secondary data processing system 126, and/or other devices or logic operating in the vehicle 122 can be configured to be compatible with and operate on data streams that include the set of timestamps 112, as part of the expected data elements or components contained in or associated with the one or more data streams 110. In aspects, this configuration may differ from existing vehicle data platforms, which may be configured to operate on data that is delivered on a contemporaneous, live, real-time, or "on-the-fly" basis in serial fashion, with no ability to process associated timestamp or other temporal information. According to aspects, the processing performed by the primary data processing system 108, secondary data processing system 126, and/or other devices or logic operating in the vehicle 122 according to the present teachings in certain regards is therefore not required to be coupled to the one or more data streams 110 on a "live" or immediate basis, but can instead proceed at times after, and take into account time periods before or after, the data points reflected in the one or more data streams 110 are received and stored.

According to aspects, and again as shown in FIG. 1, during normal and/or uninterrupted operation, the secondary data processing system 126 can be configured to monitor, sample, encode, and/or store the one or more data streams 110 along with or at the same time as the primary data processing system 108, to create redundantly stored, registered, or backup data streams that can continuously record the one or more data streams 110 and/or a sampled subset 114 thereof for backup or data recovery purposes. In aspects, the secondary data processing system 126 can be configured to record the one or more data streams 110 in full or complete form, with no conditioning or alteration of the constituent data. In aspects, the secondary data processing system 126 can in addition or instead be configured to derive a sampled subset 114 of the one or more data streams 110 for storage in the secondary data buffer 106 of the secondary data processing system 126. In aspects, the sampled subset 114 can be or include data values extracted from the one or more data streams 110, but which are processed to produce a subset or smaller set of the same data. The sampled subset 114 can, for example, include data values that reflect values that are downsampled to a lower sampling rate than the originally-encoded one or more data streams 110.

In aspects, the sampled subset 114 can also or instead include data values extracted from the one or more data streams 110, but whose bit values or resolution is reduced from the originally-encoded one or more data streams 110, such as, for example, to reduce a 32-bit data value to a 16-bit data value. Other types of data reduction, conditioning, conversion, and/or alteration can be performed on some or all of the data values included in the one or more data streams 110 to generate or produce the sampled subset 114, when used. According to aspects, the use of a sampled subset 114 can increase and/or maximize the effective storage capacity, and/or interval or period over which, the secondary storage buffer 106 can store the one or more data streams 110 and/or the sampled subsets 114 thereof. In implementations, the sampled subset 114 can comprise reduced versions of one or more variables or values received from all of the one or more sensors 102 and reflected in the one or more data streams 110, and/or can comprise only a selected number of variables or values from the one or more sensors 102 and/or other data sources, and reflected in the one or more data streams 110.

During normal operation, both the primary data processing system 108 and secondary data processing system 126 can continuously or periodically record the one or more data streams 110 and/or a sampled subset 114 thereof. In cases, adjustments may be made in the processing or storage of the set of data streams and/or sampled subset 114, to account for or reflect special conditions for certain sensors and/or other data sources. For example, in some odometers installed on commercial trucks or other vehicles, the registered number of miles that the odometer records before turning over or resetting to a value of zero maybe comparatively limited, such as, for example, values or limits of 50 miles, 100 miles, 1000 miles, and/or other relatively short total distances or amounts. In the case of odometers of this type, the primary data processing system 108, secondary data processing system 126, and/or other device or logic can be configured to keep track of the total number of resets and actual accumulated mileage after or across each reset, to accurately reflect total distance traveled even though individual readings may reflect a comparatively low value soon after a reset of the odometer takes place. Other types of adjustments to the one or more data streams 110 and/or sampled subset 114 can be performed, depending on the types of sensors installed in vehicle 122, the types of data produced by those sensors and/or other data sources, and/or other factors.

In implementations, the primary data processing system 108 can likewise, and as also shown in FIG. 1, be configured to record other information useful to the processing of the one or more data streams 110 and recovery operations to retrieve that data, including a set of saved state data 140 which can record the machine state of the primary data processing system 108 while that system is operating normally or without fault or interruption. The set of saved state data 140 can for example include information related to the state of the processor of the primary data processing system 108, the memory of the primary data processing system 108, the (hard disk, solid state, or other) storage media of the primary data processing system 108, the active threads and other execution states of software running on the primary data processing system 108, the state of input/output ports on the primary data processing system 108, and/or other state information for hardware, software, and/or service resources of the primary data processing system 108. In aspects, the set of saved state data 140 can be saved on a periodic, regular, and/or event-triggered basis, and can be stored to non-volatile memory or storage maintained or accessed by the primary data processing system 108. In aspects, the set of saved state data 140 can be used to restart or reinitialize the primary data processing system 108, as part of the data recovery processes described herein. According to aspects, the primary data processing system 108 can also maintain a saved timestamp of the last-received data element 144 in the set of saved state data 140, to permit the primary data processing system 108 to order and organize the one or more data streams 110 during data recovery operations, as also described herein.

Figure 2:
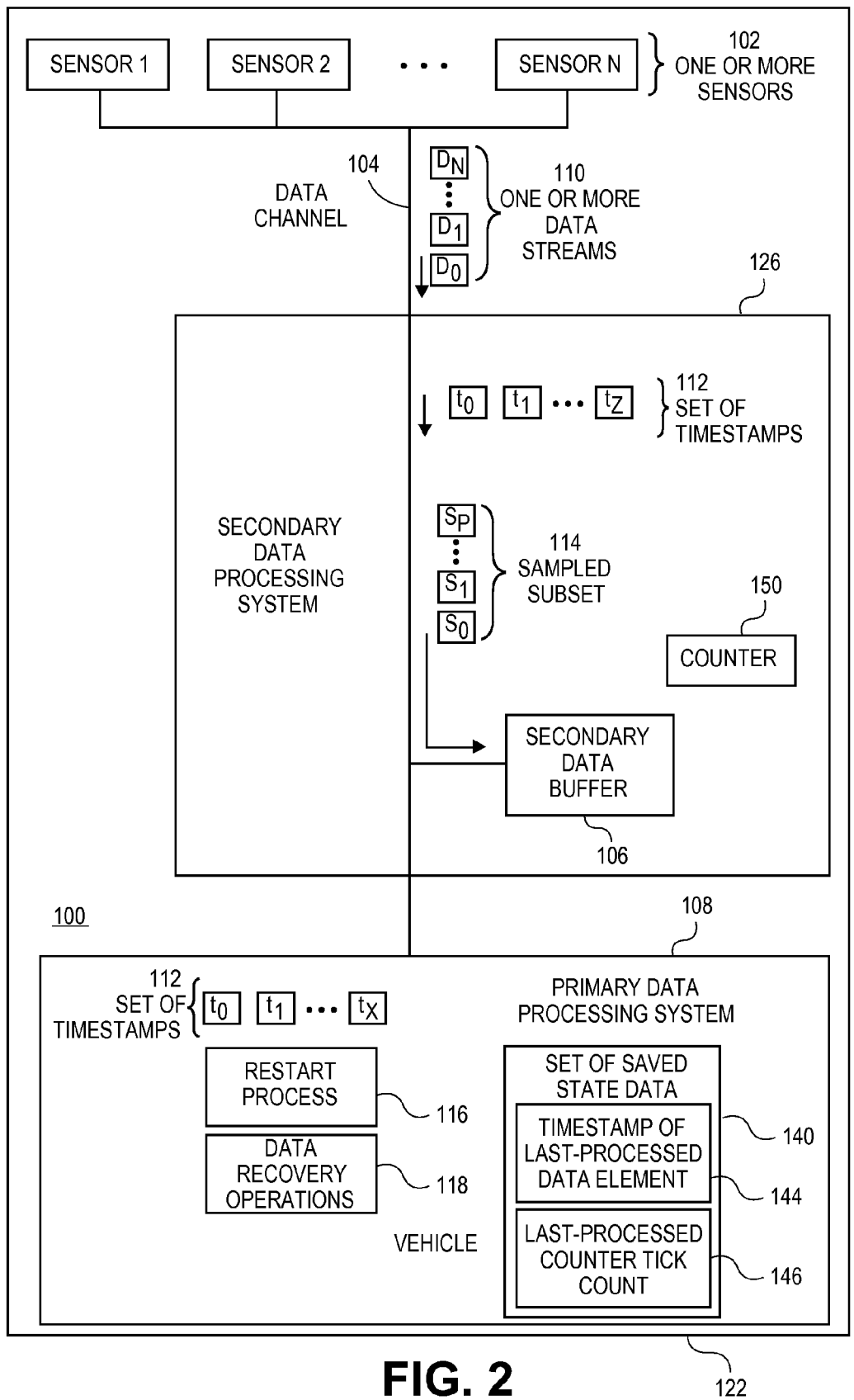
FIG. 2 illustrates an overall system for vehicle monitoring with processing interruption tolerance, according to various aspects in further regards.

When an interruption in the data processing performed by the primary data processing system 108 occurs, and as illustrated for example in FIG. 2, processing can be maintained in the secondary data processing system 126 to attempt to continue to capture and preserve the one or more data streams 110, the sampled subset 114, and/or other portions of the data produced by vehicle 122, in order to preserve the vehicle's sensor data values for management, maintenance, logistical, regulatory or other purposes, despite the fault or interruption. In aspects, the fault or interruption can be or include, for example, a software fault, error, or exception in the primary data processing system 108, a hardware fault, error, or exception in the primary data processing system 108, and/or other faults or anomalies in the primary data processing system 108 and/or any other component of the vehicle 122 which cause regular data processing in the primary data processing system 108 to be interrupted.

In those and other situations, the secondary data processing system 126 can continue to receive, sample, and/or record the one or more data streams 110 and/or sampled subset 114, and continue to store those values to secondary data buffer 106. In aspects, after the interruption or other exception, the primary data processing system 108, secondary data processing system 126, and/or other device, logic, application, and/or service can initiate a restart process 116 to re-start the primary data processing system 108. The restart process 116 can, in implementations, be performed by performing an automatic boot operation from a basic input/output system (BIOS) stored in read-only memory (ROM) of the primary data processing system 108, and/or by performing any other self-configured recovery or reset process in the primary data processing system 108. While the restart process 116 can, in implementations, involve the resetting or configuration of other devices or resources, including for example the primary data processing system 108 and/or possibly some of the one or more sensors 102, it may be noted that the secondary data processing system 126 and/or other logic can be configured continue to log and capture the one or more data streams 110 and/or sampled subset 114, while the restart process 116 is taking place. This can be the case even if restart process 116 requires a significant amount of time to perform, such as seconds or a few or several minutes. In aspects, the secondary data processing system 126 can thereby continuously or regularly receive the one or more data streams 110 and/or sampled subset 114 during the restart process 116, record that data to secondary data buffer 106, and make that data available to data recovery operations 118 after the restart process 116 has commenced or been completed.

In embodiments, after the restart process 116 has been initiated and/or completed, data recovery operations 118 can begin to be executed by the primary data processing system 108, and/or other logic or device to process the one or more data streams 110 associated with a set of intervening timestamps 120 reflecting the interruption downtime, to reconstruct, reconstitute, and/or restore or recover the one or more data streams 110 that was lost, not processed, and/or not captured during the interruption, fault event, restart process 116, and/or the data recovery operations 118 themselves.

Figure 3:
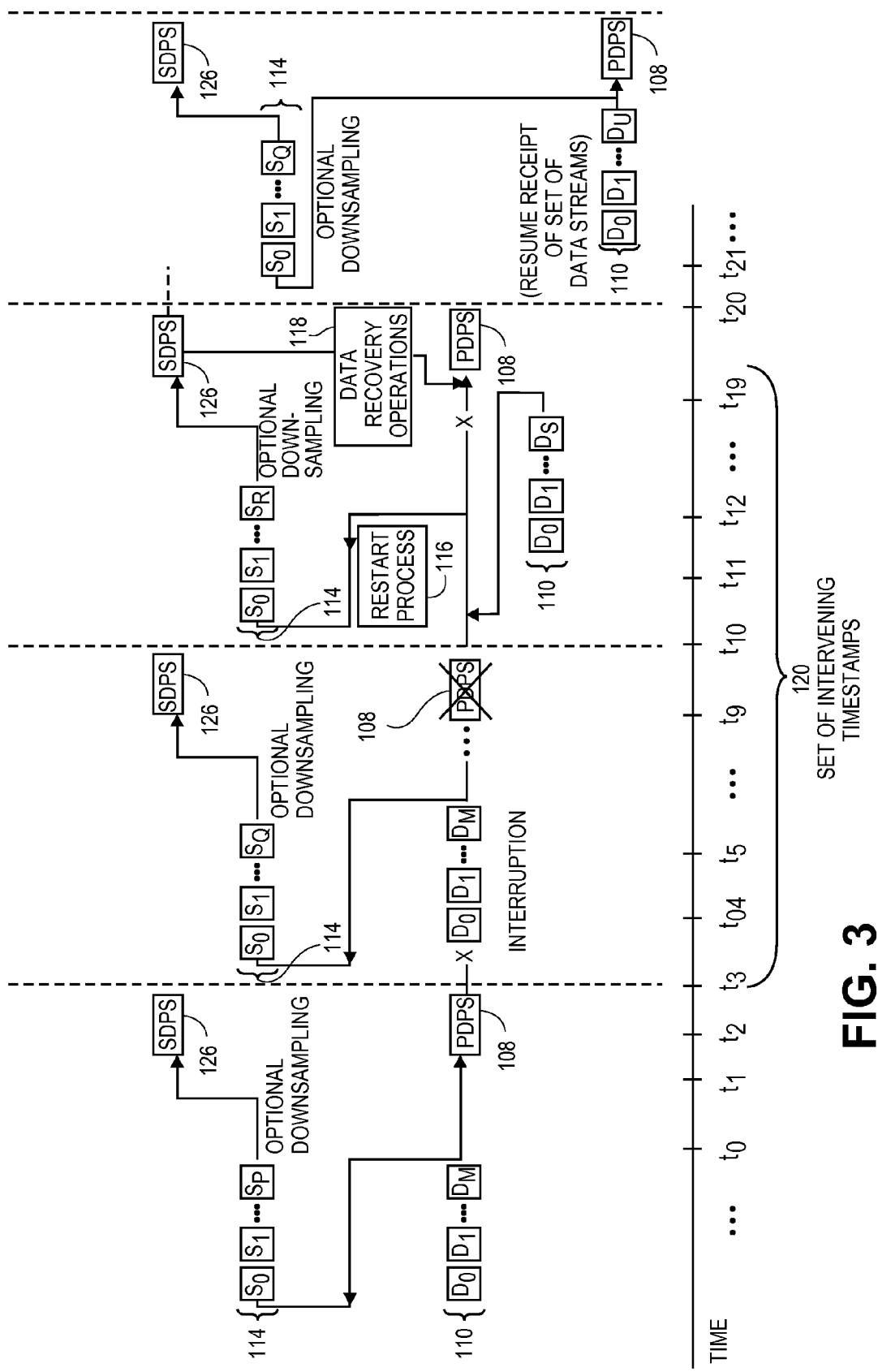
FIG. 3 illustrates a timing state diagram for the delivery of one or more data streams generated by a set of vehicle sensors, according to various aspects.

In aspects, and as shown in FIG. 3, the set of intervening timestamps 120 can be determined by examining the values of individual timestamps before, during and after the interruption and/or other fault or exception in the primary data processing system 108. In aspects, as shown, the secondary data processing system 126 can receive the one or more data streams 110 in regular course from up to time $t_2$, which marks the last valid set data points in the one or more data streams 110, before the occurrence of the interruption or fault. From $t_3$ to $t_9$, the interruption, exception, and/or fault state can persist, during which time the primary data processing system 108 is not receiving and/or processing the one or more data streams 110, while the secondary data processing system 126 continues to receive and buffer the one or more data streams 110 and/or sampled subset 114. At $t_{10}$, the primary data processing system 108 and/or other device or logic can initiate the restart process 116, in which for example the primary data processing system 108 and/or other devices or resources can be reset and/or restarted. In implementations, the restart process 116 can be initiated automatically via a basic input/output system (BIOS) of the primary data processing system 108, for example stored in read-only memory (ROM), an operating system of the primary data processing system 108, and/or other logic or control. In aspects, the restart process 116 of the primary data processing system 108 can continue through $t_{19}$.

During the period reflected in the set of intervening timestamps 120 from $t_3$ to $t_{19}$, including after the beginning or initiation of the restart process at $t_{10}$, the secondary data processing system 126 can continue to receive and buffer and/or store the one or more data streams 110 and/or sampled subset 114. At $t_{20}$, the primary data processing system 108 can begin to receive the one or more data streams 110 again, in regular fashion. In implementations, the delivery of the one or more data streams 110 to the primary data processing system 108 can be restarted or initiated by way of the primary data processing system 108 transmitting a message or command to the secondary data processing system 126 via data channel 104 and/or other connection to begin transmitting or delivering the one or more data streams 110 to the primary data processing system 108 again.

In aspects, after the start of the restart process 116, and during the illustrated interval between $t_{10}$ to $t_{20}$ and/or other times, the primary data processing system 108, secondary data processing system 126, and/or other logic, device, application or service can initiate data recovery operations 118. In the data recovery operations 118, the primary data processing system 108 and/or other logic, device, application or service can receive, access, identify, and/or extract the one or more data streams 110 stored in the secondary data buffer 106 of the secondary data processing system 126 for the set of intervening timestamps 120. That is, in the illustrative example from $t_3$ to $t_{19}$, the primary data processing system 108 can receive, record, and/or process the data from $t_3$ to $t_{19}$ after receiving that set of recovered intervening data from the secondary data processing system 126. In aspects, in cases where the data stored in the secondary data processing system 126 for the set of intervening timestamps 120 includes a sampled subset 114, that data can be reconstructed or recovered by upsampling, expanding the bit resolution, and/or performing other data conditioning or formatting before or after receipt of that data in the primary data processing system 108. Alternatively, the sampled subset 114 may be employed to reconstruct and/or recover the data, in whole or part.

In aspects, after completion of the data recovery operations 118 and resumption of normal operations of the primary data processing system 108, a valid, complete, and/or reconstructed copy of the one or more data streams 110 can be stored and hosted in the primary data processing system 108. In aspects, as long as the one or more data streams 110 associated with the set of intervening timestamps 120, and/or otherwise received and stored in the secondary data processing system 126 during the restart process 116 and/or recovery operations 118, does not exceed the capacity of the secondary data buffer 106 of the secondary data processing system 126, this recovery can take place on a seamless basis.

Figure 4A:
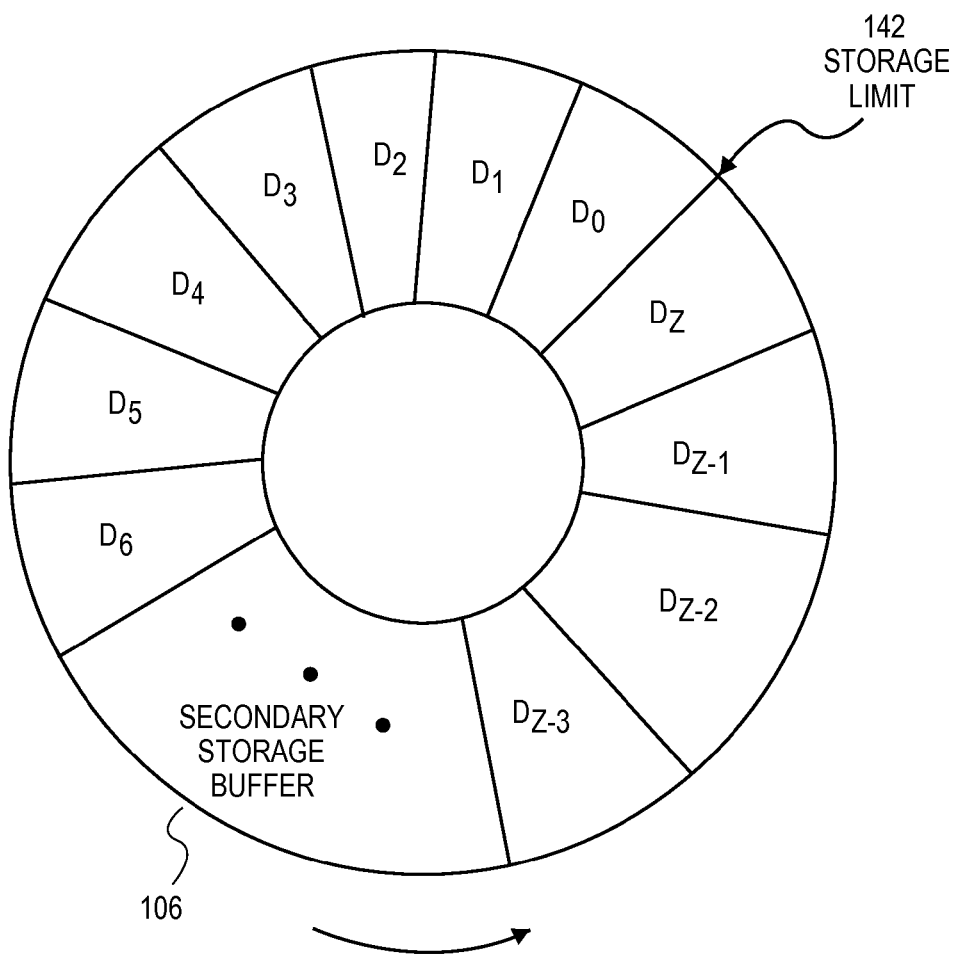
FIG. 4A illustrates an exemplary configuration of a secondary data buffer that can be used in implementations of systems and methods for vehicle monitoring with processing interruption tolerance, according to aspects.

That is, and as for example illustrated in FIG. 4A, in view of the limited or finite capacity of the secondary data buffer 106 of the secondary data processing system 126, the one or more data streams 110, sampled subset 114, set of timestamps 112, and/or other data may reach a last available address or storage space, before a desired amount of buffered data was stored. In such situations, a need can arise to begin storing or recording that and/or other data over again in the first available address or location in the storage space. As long as the secondary data processing system 126 is recording data safely within the storage limit 142 of the secondary data buffer 106, the one or more data streams 110 can be stored in that storage in contiguous fashion, and read out and/or processed by the primary data processing system 108 in serial fashion. In aspects, however, the primary data processing system 108 and/or other device or logic can also be configured to take into account the possibility of storage wrap-around conditions, in which the storage of a next-arriving data element reverts to the first available storage location after the storage limit 142 is reached. In aspects, the primary data processing system 108 and/or other logic can continue to receive and/or process the one or more data streams 110 in correct time order after storage "jumps" back to the first available storage location in the secondary data buffer 106, after reaching the storage limit. This can be due to the fact that, for example, the set of timestamps 112 can continue to be read and processed to place the data elements of the one or more data streams 110 in their correct sequence or temporal order. In aspects, the storage limit 142 of the secondary storage buffer 106 can be reached at different times, depending for example on the rate of delivery of data in the one or more data streams 110, which can vary for example based on the operating conditions of the vehicle 100, the configuration or settings of the one or more sensors 102, the configuration and/or operating state of the primary data processing system 108 and/or other devices or logic, and/or based on other factors. In aspects, and as noted, the secondary storage buffer 106 can be implemented as a circular buffer, in which case the secondary data processing system 126 can simply continue to store the one or more data streams 110 directly to that buffer after reaching the storage limit 142, with an automatic overwrite of the first available storage locations after making that jump.

Figure 4B:
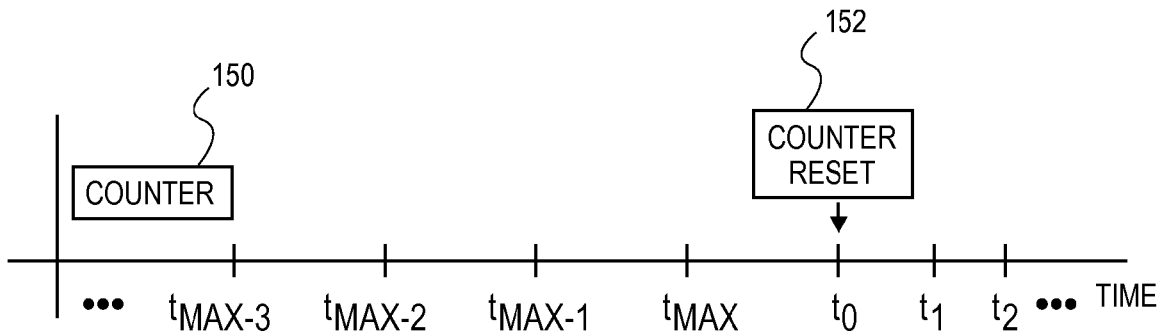
FIG. 4B illustrates a counter reset event that can be implemented in counters that can be used in implementations of systems and methods for vehicle monitoring with processing interruption tolerance, according to aspects.

In aspects, and as for example show in FIG. 4B, the primary data processing system 108 and/or other device or logic can likewise be configured to monitor for, or take account of, a wrap-around condition or reset event that may take place in the counter 150 and/or other time reference during operation of the primary data processing system 108. In particular, and in aspects as shown, the counter 150 and/or other clock source or time reference can have a maximum time interval over which that device or reference can operate. In aspects, that maximum interval may be determined, merely for example, by the bit length of the counter 150 and/or other register, device or mechanism used to create the time values associated with the set of timestamps 112.

In aspects, the primary data processing system 108 can accordingly be configured or programmed to be aware of or monitor for the detection of counter reset 152 of the counter 150, and/or other time reference or source. The counter reset 152 can consist of the counter 150 changing over from a maximum time value, such as 999 hours: 59 seconds, to a zero value for the next clock "tick" or time value. In aspects, the time order of the one or more data streams 110 could be rendered unclear if the primary data processing system 108 was not configured or programmed to detect and/or receive notification of the counter reset 152, and apply a correction, offset, and/or other adjustment to the time values in the set of timestamps 112 to maintain the data elements of the one or more data streams 110 in correct sequence or order. This correction or recalibration can take place, for example, during the recovery operations 118, during which time the primary data processing system 108 is examining the values of the set of timestamps 112 to determine which data elements in the set of data streams can be safely "skipped" because they have already been processed (for example, by reference to the timestamp of the last-processed data element 144).

It may also be noted that in implementations, the duration over which the one or more data streams 110, sampled subset 114, set of timestamps 112, and/or other data that is stored in the secondary data buffer 106 can be limited to a total interval that is deliberately set to a value less than the actual maximum time interval that can be clocked by counter 150, to ensure data integrity and avoid calculation of erroneous time differences due to counter reset 152. These implementations can for example be used when set of timestamps 112 are encoded as raw counts or clock ticks, which do not themselves reflect full date and time information.

Thus, for example, if a clock register 32 bits in width is used by counter 150, in implementations, if incremented as a counter once per millisecond, the counter 150 would reach a maximum value and reset to zero after an interval of approximately 49 days. Other bit widths and total counter intervals can be used. To ensure that the logic can recognize when this occurs, in such cases the primary data processing system 108, secondary data processing system 126, and/or other device or logic can be configured to operate over after a significantly shorter interval or time period, such as one day or one hour. Provided that the maximum possible time difference between any two timestamps is less than half of the maximum time interval (such as 49 days in the aforementioned implementations), it is possible to detect that a counter reset 152 has taken place, since differences greater than that amount necessarily reflect a counter reset 152. In aspects, the secondary data processing system 126 and/or other logic can be configured to compensate for a detected counter reset 152, such as by adding or subtracting an offset value from time values recorded in the set of timestamps 122 and/or other data. After the end of any shortened time period used by secondary data processing system 126 (which again can be configured to be less than half the maximum possible interval that can be counted by the counter 150), the secondary data processing system 126 and/or other device or logic can be configured to remove, discard, re-order, and/or ignore the data stored up to that point, again to safeguard against undesired effects of a counter reset 152, including ambiguity in the order of data elements in the one or more data streams 110. Other configurations, intervals, limits, and/or adjustments can be used to reduce or eliminate the effects of a counter reset 152 and/or associated conditions, including, merely for example, an adjustment in the sampling rate used to create the sampled subset 114. In general, the foregoing techniques relate to limiting the time interval over which data can be collected, so that any two timestamps in that limited interval can be compared and a counter reset 152 can be detected based on that comparison, since in the absence of a counter reset 152 the differences between timestamps will always be comparatively small.

In aspects, further situations can occur during operation in which timestamps located within a limited time interval being used by the secondary data processing system 126 are compared to one or more other timestamps that are not drawn from the same collection of timestamps guaranteed to be located within a relatively small time difference of each other. This can take place, for example, when an interruption of the primary data processing system 108 has taken place, and a comparison must be made between the time value that the primary data processing system 108 has recorded at the last successful processing point, and the time values that continue to be recorded in the secondary data processing system 126 during the restart process 116 and/or data recovery operations 118. It may be noted that in embodiments, and as for example shown in FIG. 2, the set of saved state data 140 recorded by the primary data processing system 108 can also include a last-processed counter tick count 146, reflecting the last count value generated by the counter 150 and received by the primary data processing system 108 before an interruption takes place. Provided that the last-processed counter tick count 146 saved by the primary data processing system 108 is not much older in time than the maximum time interval that the secondary data processing system 126 is set to record (e.g., several minutes or hours to several days), it is possible to detect that a counter reset 152 has occurred between the time of the last-processed counter tick count 146 and a tick count value received from the secondary data processing system 126. This is because the computed difference (or absolute value of that difference) between those count values can be identified as larger than the maximum expected value. In aspects, in the unusual case where the primary data processing system 108 stopped a comparatively long time ago, for example 49 days as in the implementations discussed above, it is possible that the counter 150 has counted through its range since that time, and reached a value similar or close to its original value. In this case, the time at which the last-processed counter tick count 146 was captured would appear to be relatively recent and close to count values stored in the secondary data processing system 126, although in fact the time points are separated by weeks of time. In these and other implementations, therefore, to avoid such scenarios the primary data processing system 108 can be configured to store the full value of the last processed time stamp in the form of the timestamp of the last-processed data element 144, and/or in other parameters or variables, which can be used to determine that the shutdown time has been unusually long, and thereby avoid ambiguity in time points and/or data ordering. In the case of long shutdowns or interruptions of the primary data processing system 108, it can be deduced or determined that none of the data stored in the secondary data processing system 126 has already been processed, so that no check for already-processed data is required.

In general, therefore, according to aspects of the present teachings, the portion of the one or more data streams 110 which, and/or processing of which, would have been lost, interrupted, corrupted, or suspended, due to the original interruption followed by performance of the restart process 116 and/or data recovery operations 118, can be transparently and automatically recovered by the inventive platforms and techniques. This recovery capability is, in part, due to the capability of the inventive platforms and techniques to associate a unique (temporal) identifier with data elements in the one of more data streams 110, which persists for the life of that data as it is processed in the system. This recovery capability is in contrast to conventional platforms not configured in the manner of the inventive platforms and techniques described herein, in which data that is lost during an interruption is typically or always permanently lost.

Figure 5:
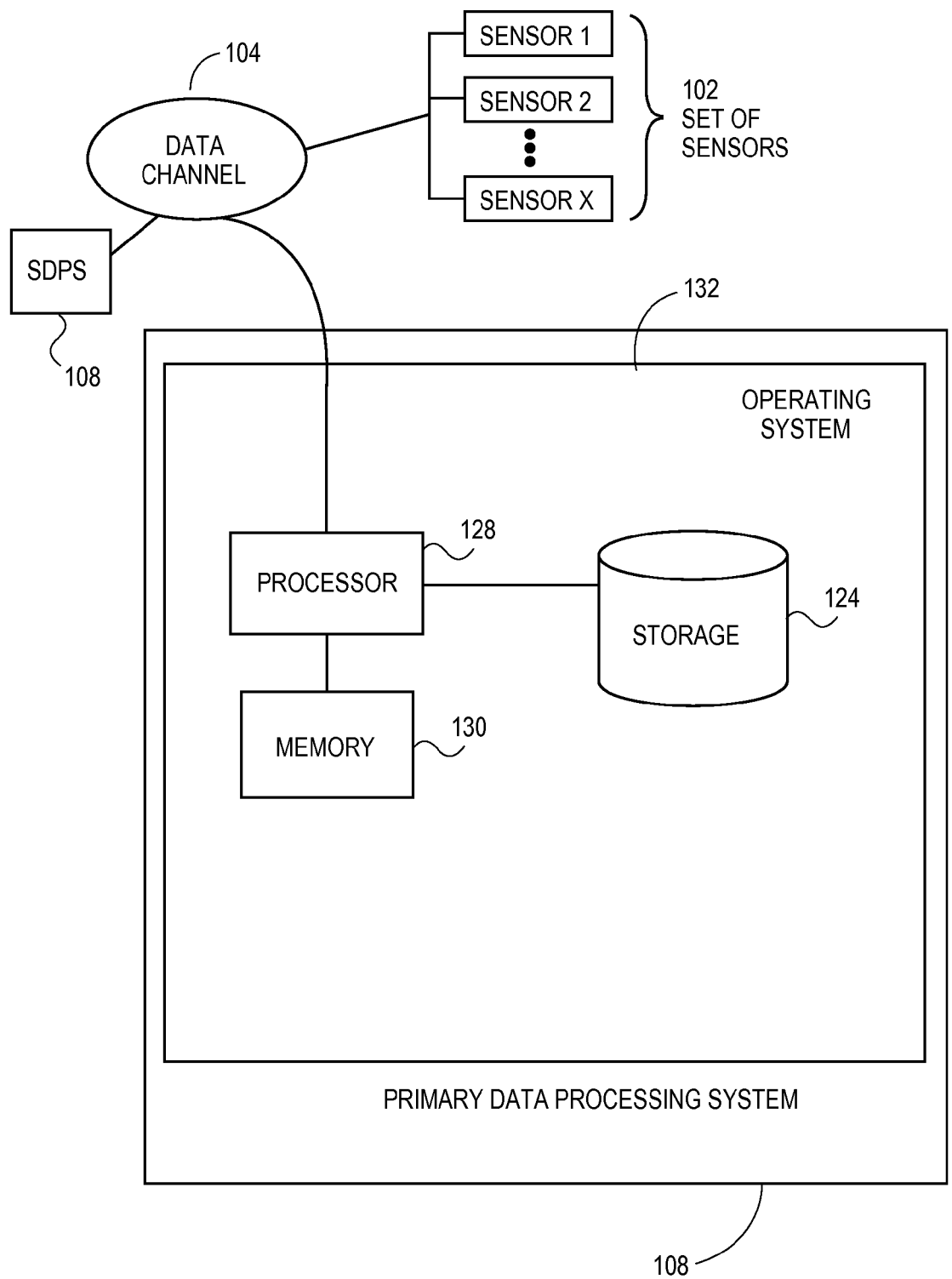
FIG. 5 illustrates an exemplary hardware diagram of a vehicle input/output processor and associated resources, according to various embodiments.

FIG. 5 illustrates an exemplary diagram of hardware and other resources that can be incorporated in the primary data processing system 108 in accordance with systems and methods for vehicle monitoring with processing interruption tolerance, according to aspects. In embodiments as shown, the primary data processing system 108 can comprise a processor 128 communicating with memory 130, such as electronic random access memory, operating under control of or in conjunction with operating system 132, and/or other custom firmware or software. Processor 128 can be or include a microprocessor, microcontroller, and/or other control chip or logic. Operating system 132 can be or include any general-purpose or special-purpose operating system, including those designed for embedded control applications. Processor 128 also communicates with storage 124, such as a local hard drive, optical, and/or solid state drive. Processor 128 further communicates with data channel 104, such as a car area network (CAN) or vehicle area network (VAN) connection, and/or other wired or wireless data connection. Processor 128 also communicates with the one or more sensors 102 via the data channel 104, and with the secondary data processing system 126 via the data channel 104, to execute control logic, data recording and data recovery operations in vehicle 122. Other configurations of secondary data processing system 126, associated network connections, and/or other hardware and software resources are possible. In aspects, the secondary data processing system 126 and/or other devices, platforms, or logic can be configured with the same or similar hardware, software, and/or other resources as the primary data processing system 108, or in implementations can be configured with different hardware, software, and other resources.

Figure 6:
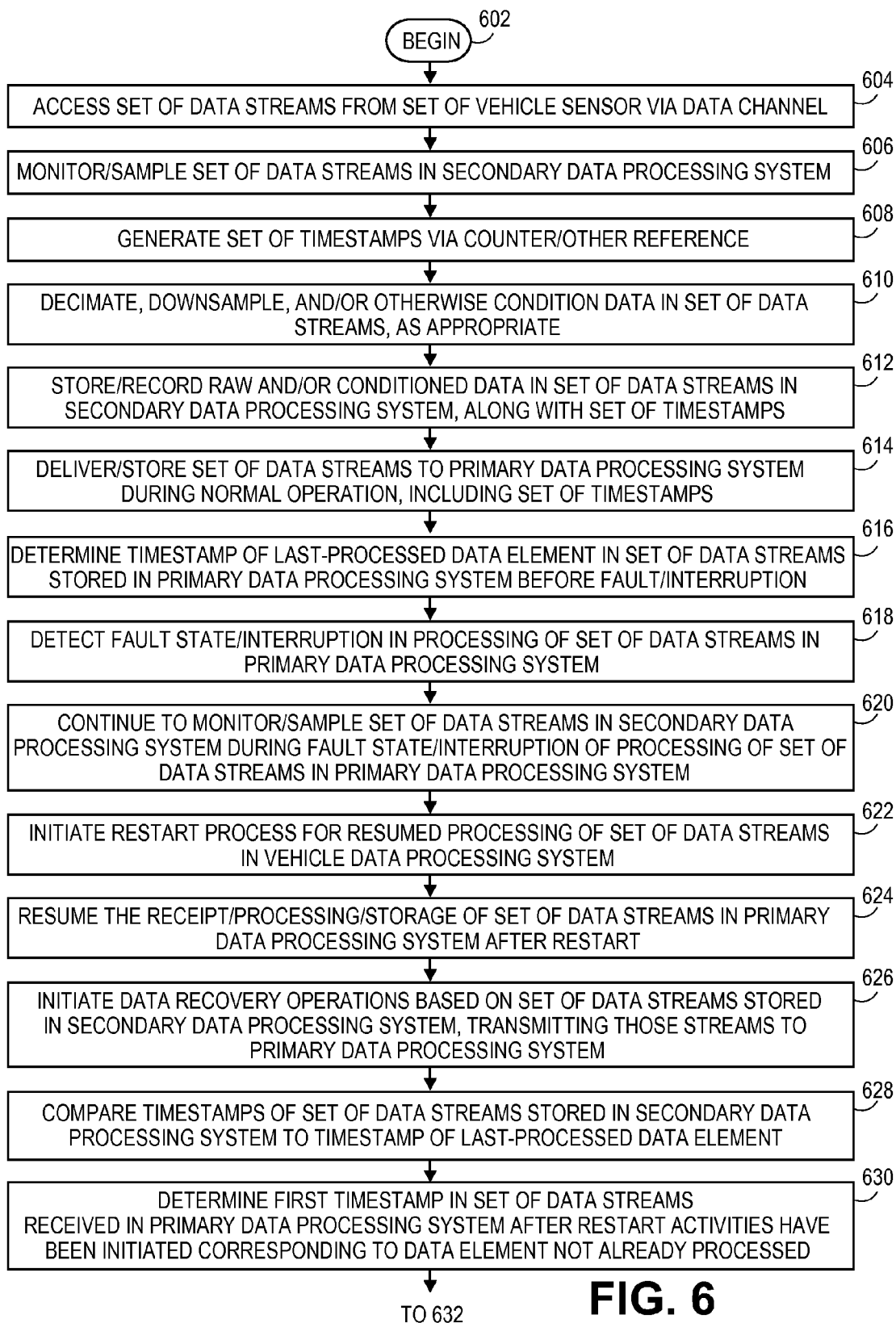
FIG. 6 illustrates a flowchart of data capture and recovery operations, according to various aspects of the present teachings.
Figure 6:
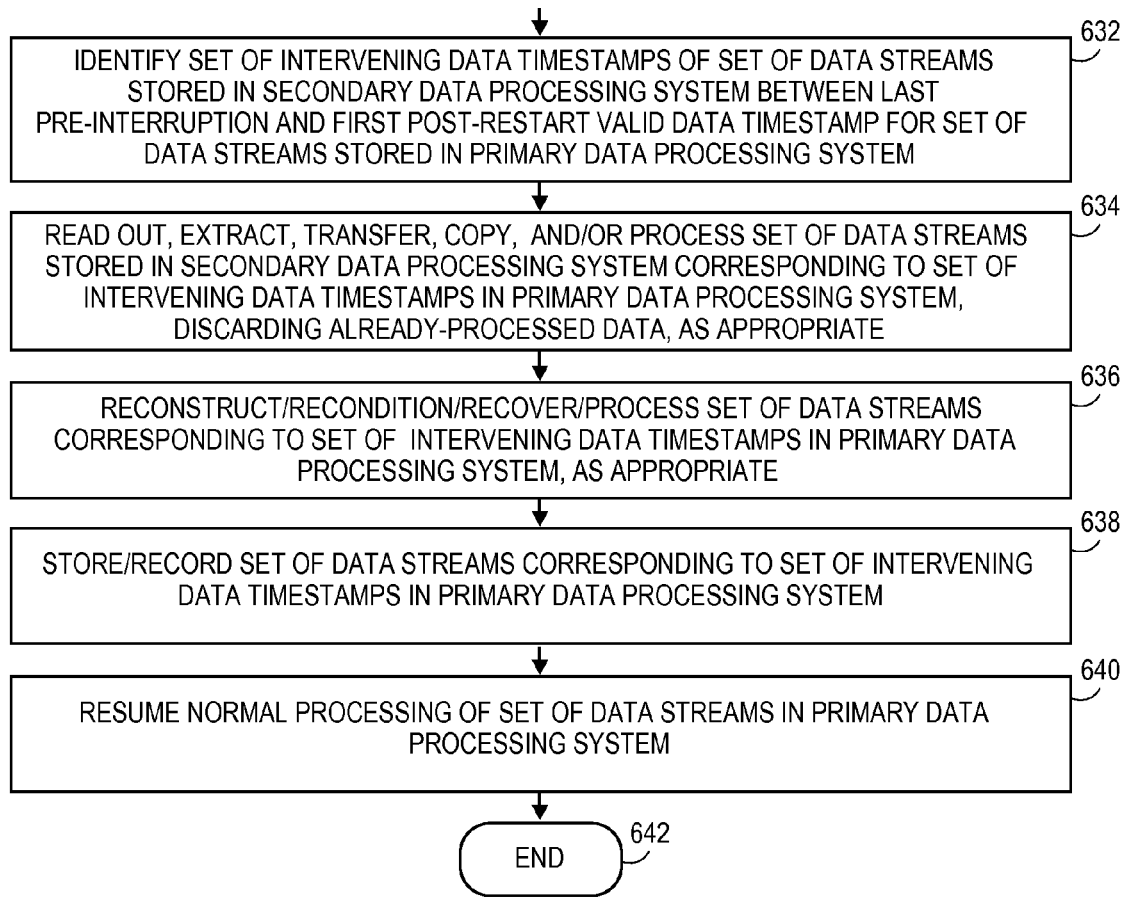

FIG. 6 illustrates a flow diagram of overall processing that can be used to capture, store, and reconstruct the set of data streams and associated information in systems and methods for vehicle monitoring with processing interruption tolerance, according to aspects. In 602, processing can begin. In 604, the one or more data streams 110 from the set of vehicle sensors 102 can be communicated to and placed onto the data channel 104, for access by other devices attached to the data channel 104. In aspects, the one or more data streams 110 from the set of data sensors 102 can be placed onto the data channel 104, such an electronic bus, such as a controller area network (CAN), vehicle area network (VAN), and/or other wired, optical, wireless, and/or other connection or interface. In implementations, each sensor in the set of vehicle sensors 102 can deliver one data stream, such as a digitized data stream, to the data channel 104. In implementations, one or more of the sensors in the set of vehicle sensors 102 can deliver two or more channels of data to the data channel 104. In implementations, the data channel 104 can comprise multiple channels or connections, and/or a multiplexed set of channels or connections, or both. In aspects, the one or more data streams 110 can also include data from aperiodic sources, and/or sources that do not sample or report data on a continuous or regular basis, such as data indicating the status of the ignition system of vehicle 122, and/or the data delivered by a tachometer device (as described herein).

In 606, the one or more data streams 110 and/or subsets of the one or more data streams 110 can be monitored, sampled, and/or stored in the secondary data processing system 126 after receipt of the one or more data streams 110 via data channel 104. In implementations, the secondary data processing system 126 can be directly connected to the data channel 104, and can be configured to monitor or "sniff" the one or more data streams 110 for storage in the secondary data buffer 106, which can again comprise electronic, magnetic, hard disk, optical, and/or other storage or media included in, or accessed by, the secondary data processing system 126. In 608, the set of timestamps 112 can be generated for the associated one or more data streams 110, for example, by attaching or embedding absolute time values generated by the counter 150 and/or other reference or source to each value of the one or more data streams 110 as those values are received in the secondary data processing system 126.

In 610, in implementations the secondary data processing system 126 can generate a sampled subset 114 of the one or more data streams 110 for storage in local storage or media, as appropriate. In aspects, the secondary data processing system 126 can for example decimate the bit length or resolution of the one or more data streams 110, for example, to reduce 32-bit data to 16-bit data, or perform other reductions or truncations in the data resolution of the data values, datagrams, fields, and/or attributes of the one or more data streams 110. In aspects, the secondary data processing system 126, in addition or instead of decimating the data, can downsample the sampled data rate of the set of data streams, for example, from 10 MHz to 5 MHz, or other values. In aspects, the secondary data processing system 126 and/or other logic can be configured to generate the sampled subset 114 to conserve memory or storage resources of the secondary data processing system 126, and/or to extend the window of time over which the secondary data processing system 126 can store the sampled subset 114 of the one or more data streams 110, before having to discard, wraparound, and/or overwrite earlier data. In 612, the one or more data streams 110 and/or the sampled subset 114 can be stored, encoded, and/or recorded in the secondary data buffer 106 of the secondary data processing system 126, for example, by storage to electronic random access memory (RAM) and/or other storage or media.

In 614, the one or more data streams 110 can be transmitted, delivered, and/or stored to or in the primary data processing system 108 during normal operation, including the set of timestamps 112. In 616, the primary data processing system 108 and/or other device, logic, or application can determine the timestamp of the last-processed data element 144.

In 618, primary data processing system 108, and/or other device, logic, application, and/or service can experience, register, and/or detect a fault state, fault condition, exception, and/or interruption in the processing of the one or more data streams 110 by the primary data processing system 108. For example, the primary data processing system 108 can experience a system crash or hung state, and after a period of non-responsiveness, the primary data processing system 108 can automatically initiate a reboot process. Other conditions and/or events can be cause or be used to identify a fault or error state in the processing of the one or more data streams 110 by the primary data processing system 108, and/or other logic or resource.

In 620, the one or more data streams 110 and/or sampled subset 114 can continue to be monitored, sampled, and/or stored in the secondary data processing system 126 during the occurrence of the fault state and/or interruption of the processing of the one or more data streams 110 in, or by, the primary data processing system 108. That is, the secondary data processing system 126 can continue to capture and record the one or more data streams 110 (and/or sampled subset 114) even during the period that the primary data processing system 108 is not processing the one or more data streams 110, due to the fault or exception. In 622, the primary data processing system 108 and/or other device, logic, application, and/or service can initiate a restart process 116 to re-start the primary data processing system 108, including to perform recovery operations 118 and/or other processing of the one or more data streams 110 by the primary data processing system 108 and/or other device or logic. It may be noted that in aspects, the primary data processing system 108 can be configured to retrieve a set of saved state data 140, reflecting the overall machine state of the primary data processing system 108 at the time of the fault or processing interruption, as part of the restart process 116. The set of saved state data 140 can comprise configuration values such as the state of memory, applications, data, input/output operations, and/or other attributes of the primary data processing system 108 while in normal or regular operation, up to the point that the processing interruption occurred. The set of saved state data 140 can likewise include, as illustrated in FIGS. 1 and 2, the saved timestamp of the last-processed data element 144, and other information. The set of saved state data 140 can be used by the primary data processing system 108 to return the primary data processing system 108 to the same machine state, condition, and/or configuration that existed at the time of the fault or interruption, helping to ensure that the processing of the one or more data streams 110 will proceed accurately and properly once resumed. The set of saved state data 140 can for example be periodically saved to static random access memory (SRAM), flash memory, hard disk, and/or other permanent, semi-permanent, and/or non-volatile storage by the primary data processing system 108, during normal operation.

In 624, the delivery, receipt, and/or storage of the one or more data streams 110 in the primary data processing system 108 can be resumed or restarted, after the restart process 116 for the primary data processing system 108 has been begun and/or completed. In 626, data recovery operations 118 can be initiated based on the one or more data streams 110 and/or sampled subset 114 stored in the secondary data processing system 126. In aspects, the data recovery operations 118 can be triggered, initiated, invoked, or started by the primary data processing system 108, and/or other device, logic, application, and/or service.

In 628, the timestamp of the last-processed data element 144 stored in the primary data processing system 108 can be compared to the set of timestamps 112 for the corresponding one or more data streams 110 stored in the secondary data processing system 126 for periods or intervals before, during, and/or after the fault event or fault condition. In general, the comparison of the timestamps of the last-processed data element 144 stored in the primary data processing system 108 to those stored in the secondary data processing system 126 can be used to organize the images of the one or more data streams 110 that were stored or processed in the primary data processing system 108 and the secondary data processing system 126 around the time of the fault or interruption, to avoid duplicate processing and resume regular processing by the primary data processing system 108 at the correct time point.

The timestamp of the last-processed data element 144 represents or identifies the portion of the one or more data streams 110 that had already been processed by the primary data processing system 108, prior to the interruption. The processing can conversely be used to identify the timestamps for the portion of the one or more data streams 110 that are available to be recovered from the secondary data processing system 126. This can, in aspects, be used to cause the processing of those values to be skipped during recovery operations 118, and avoid multiple processing passes on duplicate recovered data.

In 630, based on the information generated or accessed in 624, 626, 628, 630, and/or other information, the primary data processing system 108 and/or other device, logic, application, and/or service can determine the timestamp of the first data sample point or element in the one or more data streams 110 received by the primary data processing system 108 after the initiation of the restart process 116 which has not already been processed, indicating that recovery operations 118 will therefore be needed to recover that and following and/or later data points.

In 632, the primary data processing system 108, and/or other device, logic, application, and/or service can determine or identify the set of intervening timestamps 120 for the one or more data streams 110 that are stored in the vehicle data secondary data processing system 126, but which have not been successfully processed by the primary data processing system 108. That is, the set of intervening timestamps 120 can reflect the intervening period between the timestamp of the last-processed data element 144, and the first (post-restart) valid timestamp. The set of intervening timestamps 120 therefore identify corresponding data points or elements in the one or more data streams 110 over that period that reside in the secondary data processing system 126, but which have not yet been processed by the primary data processing system 108. In aspects, the data reflected in the data point(s) or element(s) corresponding to the set of intervening timestamps 120 can represent data which is available to be recovered without duplication from the secondary data processing system 126 in the data recovery operations 118, and/or by other processing.

In aspects, it may be noted that if an accurate or valid set of intervening timestamps 120 can not be identified, if the set of saved state data 140 can not be recovered in part or in full, and/or if the timestamp of the last-processed data elements 144 can not be determined, the primary data processing system 108 and/or other device or logic can be configured to throw out, set to null, and/or otherwise invalidate one or more portions of the one or more data streams 110. Those actions can be taken for example on one or more portions of the one or more data streams 110 between the timestamp of the last-processed data element 144 before the interruption and the first valid timestamp after the initiation of the restart process 116 and/or recovery operations 118, and/or larger or other portions of the one more data streams 110, on grounds that those values can not be accurately derived.

In 634, the primary data processing system 108, and/or other device, logic, application, and/or service can read out, extract, transfer, and/or copy the one or more data streams 110 stored in the secondary data processing system 126 corresponding to the data points or values of the one or more data streams 110 associated with or corresponding to the set of intervening timestamps 120 to the primary data processing system 108, and/or other device or target.

In 636, the primary data processing system 108 and/or other device, logic, application, and/or service can reconstruct, restore, and/or otherwise recover the one or more data streams 110 corresponding to or associated with the set of intervening timestamps 120 retrieved from the secondary data processing system 126. In aspects, the reconstruction or recovery can comprise simply copying the values of the one or more data streams 110 to storage or memory of the primary data processing system 108, and/or can comprise upsampling, decompressing, increasing the bit length of data values, reordering, and/or performing other operations to restore, reconstruct, or configure data in the recaptured or recovered one or more data streams 110, as appropriate. In 638, the primary data processing system 108, and/or other device, logic, application, and/or service can store, encode, or record the reconstructed or recovered data in the one or more data streams 110 for the set of intervening timestamps 120 in the primary data processing system 108 and/or other device or target.

In 640, the normal processing of the one or more data streams 110 in the primary data processing system 108 can be resumed. In 642, processing can return to a prior processing point, jump to a further processing point, or end.

The foregoing description is illustrative, and variations in configuration and implementation may occur to persons skilled in the art. For example, the various illustrative logic, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For further example, while embodiments have been described in which the vehicle 122 includes one primary data processing system 108 and one secondary data processing system 126, in embodiments, the vehicle 122 can include two or more primary data processing systems, and/or two or more vehicle input/output processors. For further example, while embodiments have been described in which the primary data processing system 108 and the secondary data processing system 126 cooperate to conduct data recovery operations onboard the vehicle 122, in embodiments, data reconstruction and/or recover can take place offboard the vehicle 122, for example, in an external computer to which the vehicle 122 is networked and/or communicates. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of processing vehicle data, comprising:
generating by a set of vehicle sensors in a primary data processing system with one or more data streams;
receiving the one or more data streams generated by the set of vehicle sensors in the primary data processing system, wherein data in the one or more data streams is associated with respective timestamps;
storing at least one selected subset of the one or more data streams and the timestamps in a secondary data processing system;
responding to a fault condition in the processing of the one or more data streams in the primary data processing system;
determining a timestamp of a last-processed data element in the one or more data streams that was processed by the primary data processing system prior to the fault condition; and
recovering lost data in the one or more data streams caused by the fault condition based on the at least one selected subset of the one or more data streams and the timestamps stored in the secondary data processing system, wherein recovering the lost data comprises:
comparing the timestamp of the last-processed data element to the timestamps associated with the at least one selected subset of the one or more data streams, and
restarting the processing of the at least one selected subset by the primary data processing system at a timestamp which next follows the timestamp of the last-processed data element.

2. The method of claim 1, wherein the primary data processing system is configured to process the one or more data streams on an other than live basis.

3. The method of claim 1, wherein recovering the lost data comprises discarding at least a portion of the one or more data streams when the timestamp of the last-processed data element can not be determined.

4. The method of claim 1, wherein recovering the lost data comprises retrieving a set of saved state data of the primary data processing system to restore the primary data processing system to a state that existed at the time of the fault condition.

5. The method of claim 4, wherein recovering the lost data comprises discarding at least a portion of the one or more data streams when the set of saved state data of the primary data processing system can not be retrieved.

6. The method of claim 1, wherein the secondary data processing system is configured to overwrite previously stored data in the secondary data processing system upon reaching a storage capacity limit of the secondary data processing system.

7. The method of claim 1, wherein the secondary data processing system comprises an electronic memory.

8. The method of claim 7, wherein the electronic memory comprises a circular buffer.

9. The method of claim 1, wherein the selected subset of the one or more data streams comprises a subset of the one or more data streams sampled at a different sampling rate than the one or more data streams received by the primary data processing system.

10. The method of claim 9, wherein the different sampling rate comprises a reduced sampling rate.

11. The method of claim 1, wherein the selected subset of the one or more data streams comprises a subset of the one or more data streams captured at a different bit resolution than the one or more data streams received by the primary data processing system.

12. The method of claim 11, wherein the different bit resolution comprises a reduced bit resolution.

13. The method of claim 1, wherein the set of vehicle sensors comprises at least one of a speed sensor, an odometer device, an ignition status sensor, a tachometer sensor, an acceleration sensor, a brake status sensor, a vehicle position sensor, a temperature sensor, or a wheel position sensor.

14. The method of claim 13, wherein the one or more data streams comprises at least one data stream derived from an odometer device, and wherein the primary data processing system is configured to accumulate an absolute mileage value over one or more resets of the odometer device.

15. The method of claim 1, wherein the timestamps are generated by a time reference having a maximum time interval.

16. The method of claim 15, further comprising—
determining that the time reference has been reset after reaching the maximum time interval, and
preserving a time order of the timestamps after the time reference has been reset.

17. The method of claim 15, further comprising removing one or more portions of the stored data after a period of time, wherein the period of time is based on the maximum time interval.

18. The method of claim 1, wherein the responding to the fault condition comprises initiating a restart process in the primary data processing system.

19. The method of claim 1, wherein the at least one selected subset comprises the entire one or more data streams.

20. The method of claim 1, wherein the secondary data processing system comprises a vehicle input/output processor.

21. A system for processing vehicle data, comprising:
an interface to a set of vehicle sensors generating one or more data streams, the one or more data streams having an associated timestamps;
a secondary data processing system, communicating with the set of vehicle sensors via the interface, and being configured to store at least one selected subset of the one or more data streams and the timestamps; and
a primary data processing system, communicating with the set of vehicle sensors and with the secondary data processing system, and configured to:
receive the one or more data streams,
respond to a fault condition in the processing of the one or more data streams in the primary data processing system,
determine a timestamp of a last-processed data element in the one or more data streams that was processed by the primary data processing system prior to the fault condition, and
recover lost data in the one or more data streams caused by the fault condition based on the at least one selected subset of the one or more data streams and the timestamps stored in the secondary data processing system, wherein to recover lost data, the primary data processing system is further configured to:
compare the timestamp of the last-processed data element to the timestamps of the at least one selected subset of the one or more data streams, and
restart the processing of the at least one selected subset by the primary data processing system at a timestamp which next follows the timestamp of the last-processed data element.

22. The system of claim 21, wherein the primary data processing system is configured to process the one or more data streams on an other than live basis.

23. The system of claim 21, wherein the primary data processing system is further configured to discard at least a portion of the one or more data streams when the timestamp of the last-processed data element can not be determined.

24. The system of claim 21, wherein the primary data processing system is further configured to retrieve a set of saved state data of the primary data processing system to restore the primary data processing system to a state that existed at the time of the fault condition.

25. The system of claim 24, wherein the primary data processing system is further configured to discard at least a portion of the one or more data streams when the set of saved state data of the primary data processing system can not be retrieved.

26. The system of claim 21, wherein the secondary data processing system is configured to overwrite previously stored data in the secondary data processing system upon reaching a storage capacity limit of the secondary data processing system.

27. The system of claim 21, wherein the secondary data processing system comprises an electronic memory.

28. The system of claim 27, wherein the electronic memory comprises a circular buffer.

29. The system of claim 21, wherein the selected subset of the one or more data streams comprises a subset of the one or more data streams sampled at a different sampling rate than the one or more data streams received by the primary data processing system.

30. The system of claim 29, wherein the different sampling rate comprises a reduced sampling rate.

31. The system of claim 21, wherein the selected subset of the one or more data streams comprises a subset of the one or more data streams captured at a different bit resolution than the one or more data streams received by the primary data processing system.

32. The system of claim 31, wherein the different bit resolution comprises a reduced bit resolution.

33. The system of claim 21, wherein the set of vehicle sensors comprises at least one of a speed sensor, an odometer device, an ignition status sensor, a tachometer sensor, an acceleration sensor, a brake status sensor, a vehicle position sensor, a temperature sensor, or a wheel position sensor.

34. The system of claim 33, wherein the one or more data streams comprises at least one data stream derived from an odometer device, and wherein the primary data processing system is configured to accumulate an absolute mileage value over one or more resets of the odometer device.

35. The system of claim 21, wherein the timestamps are generated by a time reference having a maximum time interval.

36. The system of claim 35, wherein the primary data processing system is further configured to—
determine that the time reference has been reset after reaching the maximum time interval, and
preserve a time order of the timestamps after the time reference has been reset.

37. The system of claim 35, wherein the secondary data processing system is further configured to remove one or more portions of the stored data after a period of time, wherein the period of time is based on the maximum time interval.

38. The system of claim 21, wherein the primary data processing system is further configured to respond to the fault condition by initiating a restart process in the primary data processing system.

39. The system of claim 21, wherein the at least one selected subset comprises the entire one or more data streams.

40. The system of claim 21, wherein the secondary data processing system comprises a vehicle input/output processor.

41. A system for processing vehicle data, comprising:
first means for providing an interface to a set of vehicle sensor means generating one or more data streams having an associated timestamps;
second means for providing a secondary data processing system, communicating with the set of vehicle sensor means via the interface, and being configured to store at least one selected subset of the one or more data streams and the timestamps; and
third means for providing a primary data processing system, communicating with the set of vehicle sensor means and with the second means for providing the secondary data processing system, and configured to:
receive the one or more data streams,
respond to a fault condition in the processing of the one or more data streams in the primary data processing system,
determine a timestamp of a last-processed data element in the one or more data streams that was processed by the third means for providing a primary data processing system prior to the fault condition, and
recover lost data in the one or more data streams caused by the fault condition based on the at least one selected subset of the one or more data streams and the timestamps stored in the secondary data processing system, wherein to recover lost data, the third means for providing a primary data processing system is further configured to:
compare the timestamp of the last-processed data element to the timestamps of the at least one selected subset of the one or more data streams, and
restart the processing of the at least one selected subset by the third means for providing a primary data processing system at a timestamp which next follows the timestamp of the last-processed data element.

42. The system of claim 41, wherein the third means for providing a primary data processing system is configured to process the one or more data streams on an other than live basis.

43. The system of claim 41, wherein the third means for providing a primary data processing system is further configured to discard at least a portion of the one or more data streams when the timestamp of the last-processed data element can not be determined.

44. The system of claim 41, wherein the third means for providing a primary data processing system is further configured to retrieve a set of saved state data of the third means for providing a primary data processing system to restore the third means for providing a primary data processing system to a state that existed at the time of the fault condition.

45. The system of claim 44, wherein the third means for providing a primary data processing system is further configured to discard at least a portion of the one or more data streams when the set of saved state data of the third means for providing a primary data processing system can not be retrieved.

46. The system of claim 41, wherein the second means for providing a secondary data processing system is configured to overwrite previously stored data in the second means for providing secondary data processing system upon reaching a storage capacity limit of the second means for providing a secondary data processing system.

47. The system of claim 41, wherein the secondary data processing system comprises fourth means for providing an electronic memory.

48. The system of claim 47, wherein the fourth means for providing an electronic memory comprises fifth means for providing a circular buffer.

49. The system of claim 41, wherein the selected subset of the one or more data streams comprises a subset of the one or more data streams sampled at a different sampling rate than the one or more data streams received by the third means for providing a primary data processing system.

50. The system of claim 49, wherein the different sampling rate comprises a reduced sampling rate.

51. The system of claim 41, wherein the selected subset of the one or more data streams comprises a subset of the one or more data streams captured at a different bit resolution than the one or more data streams received by the third means for providing a primary data processing system.

52. The system of claim 51, wherein the different bit resolution comprises a reduced bit resolution.

53. The system of claim 41, wherein the set of vehicle sensor means comprises at least one of a speed sensor means, an odometer device means, an ignition status sensor means, a tachometer sensor means, an acceleration sensor means, a brake status sensor means, a vehicle position sensor means, a temperature sensor means, or a wheel position sensor means.

54. The system of claim 53, wherein the one or more data streams comprises at least one data stream derived from an odometer device means, and wherein the third means for providing a primary data processing system is configured to accumulate an absolute mileage value over one or more resets of the odometer device means.

55. The system of claim 41, wherein the timestamps are generated by a time reference means having a maximum time interval.

56. The system of claim 55, wherein the third means for providing a primary data processing system is further configured to—
   determine that the time reference means has been reset after reaching the maximum time interval, and
   preserve a time order of the timestamps after the time reference means has been reset.

57. The system of claim 55, wherein the second means for providing a secondary data processing system is further configured to remove one or more portions of the stored data after a period of time, wherein the period of time is based on the maximum time interval.

58. The system of claim 41, wherein the third means for providing a primary data processing system is further configured to respond to the fault condition by initiating a restart process in the third means for providing a primary data processing system.

59. The system of claim 41, wherein the at least one selected subset comprises the entire one or more data streams.

60. The system of claim 41, wherein the second means for providing a secondary data processing system comprises fifth means for providing a vehicle input/output processor.

61. A computer program product, comprising:
   a non-transitory computer-readable medium comprising:
      at least one instruction for causing a computer to receive one or more data streams generated by a set of vehicle sensors in a primary data processing system, the one or more data streams having an associated timestamps;
      at least one instruction for causing a computer to store at least one selected subset of the one or more data streams and the timestamps in a secondary data processing system;
      at least one instruction for causing a computer to respond to a fault condition in the processing of the one or more data streams in the primary data processing system;
      at least one instruction for causing a computer to determine a timestamp of a last-processed data element in the one or more data streams that was processed by the primary data processing system prior to the fault condition; and
      at least one instruction for causing a computer to recover lost data in the one or more data streams caused by the fault condition based on the at least one selected subset of the one or more data streams and the timestamps stored in the secondary data processing system, wherein the at least one instruction for causing a computer to recover the lost data comprises:
         at least one instruction for causing a computer to compare the timestamp of the last-processed data element to the timestamps of the at least one selected subset of the one or more data streams, and
         at least one instruction for causing a computer to restart the processing of the at least one selected subset by the primary data processing system at a timestamp which next follows the timestamp of the last-processed data element.

62. The computer program product of claim 61, wherein the primary data processing system is configured to process the one or more data streams on an other than live basis.

63. The computer program product of claim 61, wherein the at least one instruction for causing a computer to recover the lost data comprises at least one instruction for causing a computer to discard at least a portion of the one or more data streams when the timestamp of the last-processed data element can not be determined.

64. The computer program product of claim 61, wherein the at least one instruction for causing a computer to recovering the lost data comprises at least one instruction for causing a computer to retrieve a set of saved state data of the primary data processing system to restore the primary data processing system to a state that existed at the time of the fault condition.

65. The computer program product of claim 64, wherein the at least one instruction for causing a computer to recover the lost data comprises at least one instruction for causing a computer to discard at least a portion of the one or more data streams when the set of saved state data of the primary data processing system can not be retrieved.

66. The computer program product of claim 61, wherein the secondary data processing system is configured to overwrite previously stored data in the secondary data processing system upon reaching a storage capacity limit of the secondary data processing system.

67. The computer program product of claim 61, wherein the secondary data processing system comprises an electronic memory.

68. The computer program product of claim 67, wherein the electronic memory comprises a circular buffer.

69. The computer program product of claim 61, wherein the selected subset of the one or more data streams comprises a subset of the one or more data streams sampled at a different sampling rate than the one or more data streams received by the primary data processing system.

70. The computer program product of claim 69, wherein the different sampling rate comprises a reduced sampling rate.

71. The computer program product of claim 61, wherein the selected subset of the one or more data streams comprises a subset of the one or more data streams captured at a different bit resolution than the one or more data streams received by the primary data processing system.

72. The computer program product of claim 71, wherein the different bit resolution comprises a reduced bit resolution.

73. The computer program product of claim 61, wherein the set of vehicle sensors comprises at least one of a speed sensor, an odometer device, an ignition status sensor, a tachometer sensor, an acceleration sensor, a brake status sensor, a vehicle position sensor, a temperature sensor, or a wheel position sensor.

74. The computer program product of claim 73, wherein the one or more data streams comprises at least one data stream derived from an odometer device, and wherein the primary data processing system is configured to accumulate an absolute mileage value over one or more resets of the odometer device.

75. The computer program product of claim 61, wherein the timestamps are generated by a time reference having a maximum time interval.

76. The computer program product of claim 75, further comprising—
   at least one instruction for causing a computer to determine that the time reference has been reset after reaching the maximum time interval, and
   at least one instruction for causing a computer to preserve a time order of the timestamps after the time reference has been reset.

77. The computer program product of claim 75, further comprising at least one instruction for causing a computer to remove one or more portions of the stored data after a period of time, wherein the period of time is based on the maximum time interval.

78. The computer program product of claim 61, wherein the at least one instruction for causing a computer to respond to the fault condition comprises at least one instruction for causing a computer to initiate a restart process in the primary data processing system.

79. The computer program product of claim 61, wherein the at least one selected subset comprises the entire one or more data streams.

80. The computer program product of claim 61, wherein the secondary data processing system comprises a vehicle input/output processor.

\* \* \* \* \*